(12) United States Patent
Nanut

(10) Patent No.: US 8,854,774 B1
(45) Date of Patent: Oct. 7, 2014

(54) NANUT FAULT CURRENT LIMITER CIRCUITS

(76) Inventor: James Nanut, Toorak (AU)

( * ) Notice: Subject to any disclaimer, the term of this patent is extended or adjusted under 35 U.S.C. 154(b) by 89 days.

(21) Appl. No.: 13/552,423

(22) Filed: Jul. 18, 2012

Related U.S. Application Data

(60) Provisional application No. 61/509,234, filed on Jul. 19, 2011.

(51) Int. Cl.
*H02H 3/20* (2006.01)
(52) U.S. Cl.
USPC ............................................. 361/18; 361/91.1
(58) Field of Classification Search
USPC ............................................. 361/18, 19, 91.1
See application file for complete search history.

(56) References Cited

U.S. PATENT DOCUMENTS

| 4,757,425 A | * | 7/1988 | Waltz | 362/18 |
| 5,135,725 A | * | 8/1992 | Hendrickson et al. | 422/186.15 |

* cited by examiner

*Primary Examiner* — Danny Nguyen
(74) *Attorney, Agent, or Firm* — Blakely Sokoloff Taylor & Zafmann LLP

(57) ABSTRACT

A fault current limiter includes a rectifier having AC terminals and direct current (DC) terminals, the AC terminals to be coupled to an AC power source and a load. The fault current limiter further includes a DC diode coupled in parallel across the DC terminals of the rectifier and a DC reactor coupled to the DC diode. When an AC current drawn from the AC power source is less than a predetermined threshold, the DC diode is in a forward bias state to allow the AC current flowing to the load through the DC diode. When the AC current drawn from the AC power source is greater than or equal to the predetermined threshold, the DC diode is in a reverse bias state, forcing the AC current to flow to the load through the DC reactor.

23 Claims, 17 Drawing Sheets

NANUT FAULT CURRENT LIMITER CIRCUITS

RELATED APPLICATIONS

This application claims the benefit of U.S. Provisional Patent Application No. 61/509,234, filed Jul. 19, 2011, which is incorporated by reference herein in its entirety.

FIELD OF THE INVENTION

Embodiments of the present invention relate generally to power conversion technologies. More particularly, embodiments of the invention relate to fault current limitation circuits.

BACKGROUND

There are many forms of electrical circuit protection including breakers and fuses but one attractive approach is limitation. Limitation, as opposed to breaking, involves the spontaneous increase of a pre-existing but negligible impedance which immediately limits the fault current to a defined and innocuous level. This can be achieved instantaneously with no delay, in contrast to breakers which have limited response times during which time the fault current may increase to the full value of the prospective asymmetric peak. FIG. 1 is a block diagram illustrating a typical circuit having a current limiter coupled in series to limit the amount of surged current flowing through the circuit, where current limiter 102 is to limit the amount of fault current drawn from AC source 101 by load 103. Breakers, when correctly designed and installed, will ultimately clear these currents but the faulted circuits and any included switch gear will inevitably be exposed to the fault current peak and RMS value prior to opening and clearing.

Present conventional technology surrounding fault current limitation can be divided into two categories: passive technology and active technology. Passive fault current limiters are inserted in series with the main circuit and are designed to always present impedance to the load current, regardless of the conditions of the load. The advantage of passive technology is that it is fail safe; there is a zero probability of failure and no detection circuitry is required to activate it. The disadvantage of passive technology is that it can be increase losses for the AC circuit, voltage regulation at the load, and possible large size and high cost. An example of passive technology used for fault current limitation is air cored reactors.

Active fault current limiters aim to be "smarter" in that they present almost zero impedance at less than normal load (nominal conditions) but change rapidly under the conditions of overload or fault conditions. The condition at which they change state is user defined. The advantage of active limiters is that they may be more efficient than passive limiters and smaller due to the fact that the limiting element is only inserted for short intervals. Their disadvantage is the complex detection circuitry that is needed to detect abnormal or overload conditions and force a change in state of the limiter. Often redundancy in main components is specified, causing added complication. A high component count, especially at higher voltages and currents leads to diminished reliability. This technology is classified as non fail safe as there is a non-zero probability of failure, the consequences of which can be costly. An example of active fault current technology is a static switch, using turn-off component technology (such as gate turn-off thyristor (GTO), insulated gate bipolar transistor (IGBT), or integrated gate-commutated thyristor (IGCT)).

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
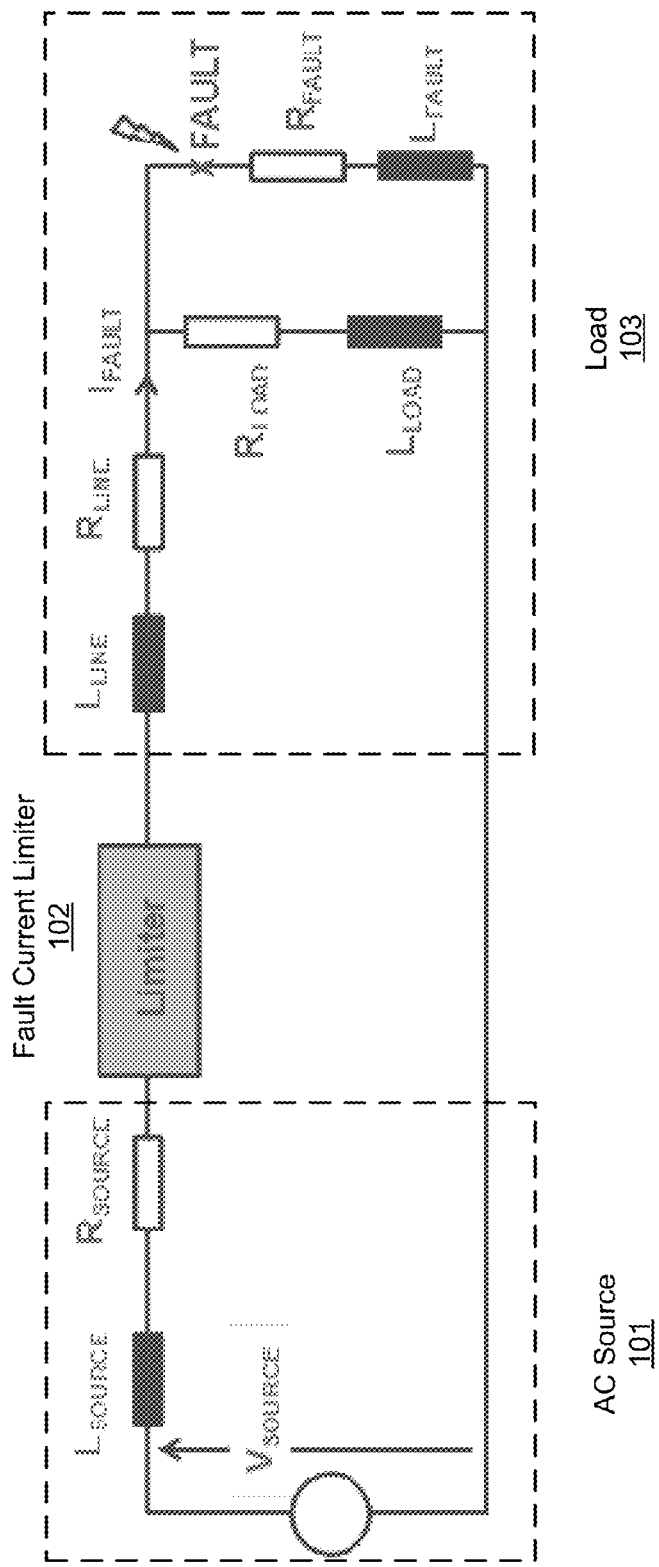
FIG. 1 is a schematic diagram illustrating a typical circuit with a fault current limiting circuit.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Techniques for limiting fault currents are described herein. According to some embodiment, techniques are to combine the advantages of passive technology and active technology into a single circuit, which reduces or eliminates the disadvantages of both approaches. The fault current limiter (FCL) described has two possible modes of operation: uninhibited and inhibited. Under uninhibited operation, the FCL as positioned in the circuit of FIG. 1 (item 102) poses as substantially zero impedance to the AC source 101. Uninhibited operation occurs as long as the instantaneous load current magnitude is below a user defined level, or threshold, regardless of load current waveform and harmonic content. Inhibited operation of the limiter occurs immediately when the instantaneous load current exceeds the user defined threshold. The user defined threshold is also known as the limiting current threshold. Under inhibited operation the FCL poses as high impedance to the AC source (101) of FIG. 1, therefore substantially diminishing the current delivered to the load when in this mode of operation. When the instantaneous load current drops below the limiting current threshold the FCL returns to uninhibited operation.

Under uninhibited conditions, according to one embodiment, a fault current limiting (FCL) circuit is to allow a load current to pass from a power supply to a load unhindered. Under inhibited conditions, when the AC current increases in a magnitude beyond a threshold (usually defined as full load conditions), the FCL circuit begins to operate as a high impedance circuit, such that a peak asymmetric fault current pulse is significantly reduced or eliminated and a steady-state root mean square (RMS) current value is below the prospective RMS value of the AC current.

In one embodiment, the FCL circuit changes the impedance state from a low (e.g., almost zero) impedance under normal conditions to a high impedance under abnormal conditions. Normal conditions mean that the power drawn by the load 103 is equal to or less than the nominal power rating of the supply 101. Under normal conditions for the application of fault current limitation the FCL remains in uninhibited state. Abnormal conditions means that the power drawn by the load 103 is greater than the nominal power rating of the supply. Under abnormal conditions for the application of fault current limitation the FCL is in inhibition mode. Uninhibited mode of the FCL means that the FCL presents substantially zero impedance to the supply, meaning that the voltage regulation problem during normal operations due to a large AC air cored or iron cored reactors normally experienced in passive FCL is substantially eliminated. Additionally, the comparable performance of fault current reduction is improved, and the comparable efficiency is better and the comparable physical footprint is smaller.

Figure 2:
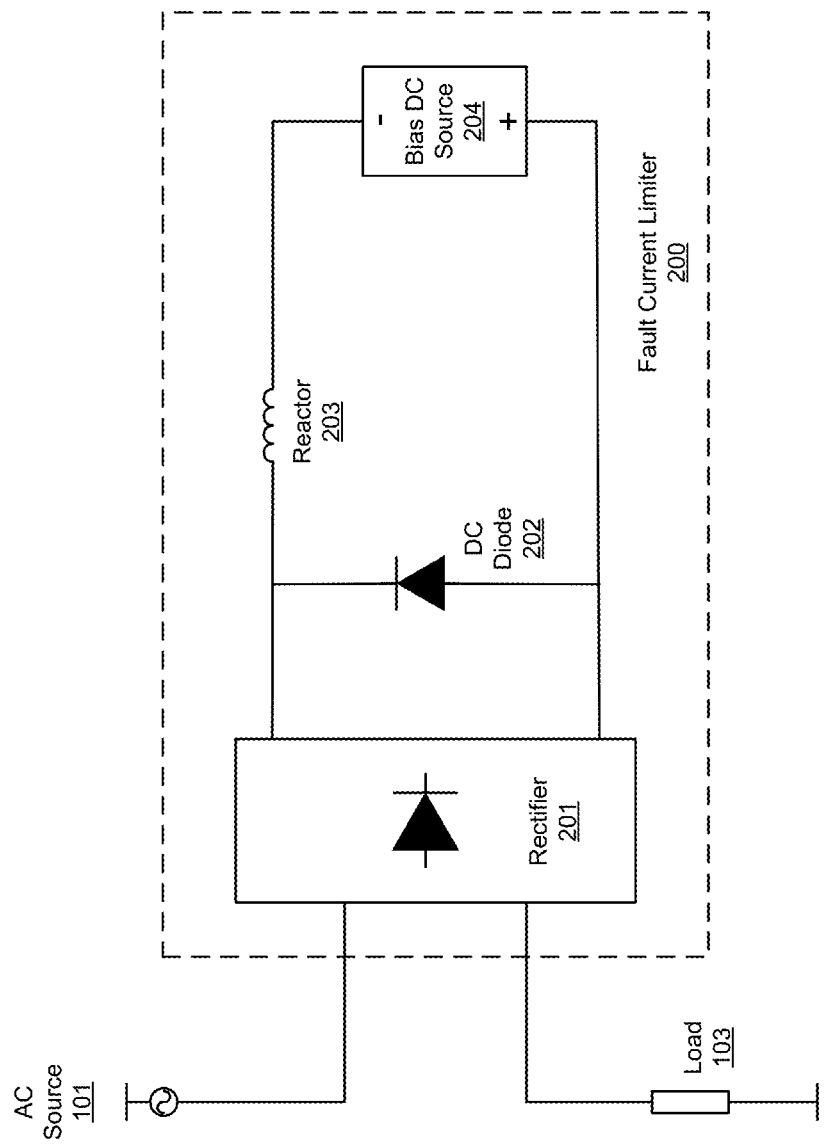
FIG. 2 is a schematic diagram illustrating an example of a fault current limiting circuit according to one embodiment of the invention.

FIG. 2 is a schematic diagram illustrating an example of a current limiter according to one embodiment of the invention. For example, fault current limiter (FCL) 200 may represent the current limiter as shown in FIG. 1. Referring to FIG. 2, according to one embodiment, current limiter 200 is connected in series between AC source 101 and load 103, where current limiter 200 is to limit an amount of current drawn from AC source 101 by load 103. Current limiter 200 includes a rectifier 201, a direct current (DC) diode 202, a DC reactor 203, and an optional bias DC source 204. Rectifier 201, referred to herein as a main rectifier, can be implemented as any kind of AC-to-DC (A/D) circuit that converts an AC current or voltage into a DC current or voltage. For example, rectifier 201 may be a rectifier bridge (e.g., a single-phase rectifier bridge) having four individual rectifiers or diodes therein. DC reactor 203 can be an inductor or transformer. Bias DC source 204 can be any DC power supply, where the DC output can be user configurable dependent upon the specific application or current limiting parameters.

In one embodiment, the AC terminals of rectifier 201 are coupled to AC source 101 and load 103. DC diode 202 is coupled to the DC terminals of rectifier 201. In addition, DC reactor 203 is coupled to DC diode 202 in parallel. Optionally, bias DC source 204 is coupled in series with DC reactor 203. Specifically, according to one embodiment, a first terminal of DC reactor 203 is coupled to a cathode terminal of DC diode 202 and a positive DC terminal of rectifier 201, forming node A. A second terminal of DC reactor 203 is coupled to a first terminal (e.g., negative terminal) of optional bias DC source 204. A second terminal (e.g., positive terminal) of bias DC source 204 is coupled to an anode terminal of DC diode 202 and a negative DC terminal of rectifier 201, forming node B. Note that bias DC source 204 is optional, which when bias DC source 204 is absent, DC reactor 203 is directly coupled to DC diode 202 in parallel. Also note that reactor 203 can be position between the anode of DC diode 202 and the positive terminal of bias DC source 204.

According to one embodiment, under normal conditions, FCL 200 allows a load current to pass from AC source 101 to load 103 unhindered. Under abnormal conditions, when the AC current increases in magnitude beyond full load conditions, FCL 200 begins to operate as high impedance such that the peak asymmetric pulse and steady state RMS fault current value are below their prospective values. FCL 200 changes a state from low (e.g., almost zero) impedance under normal conditions to high impedance under abnormal conditions, meaning that the voltage regulation problem during a normal operation due to a large AC impedance normally experienced in passive FCL is reduced or eliminated. Additionally, the comparable performance is improved; the comparable efficiency is better; and the comparable physical footprint is diminished when compared to air cored reactors. This has a low component count and no detection circuitry is required so the reliability is comparatively better than an active FCL.

Figure 3:
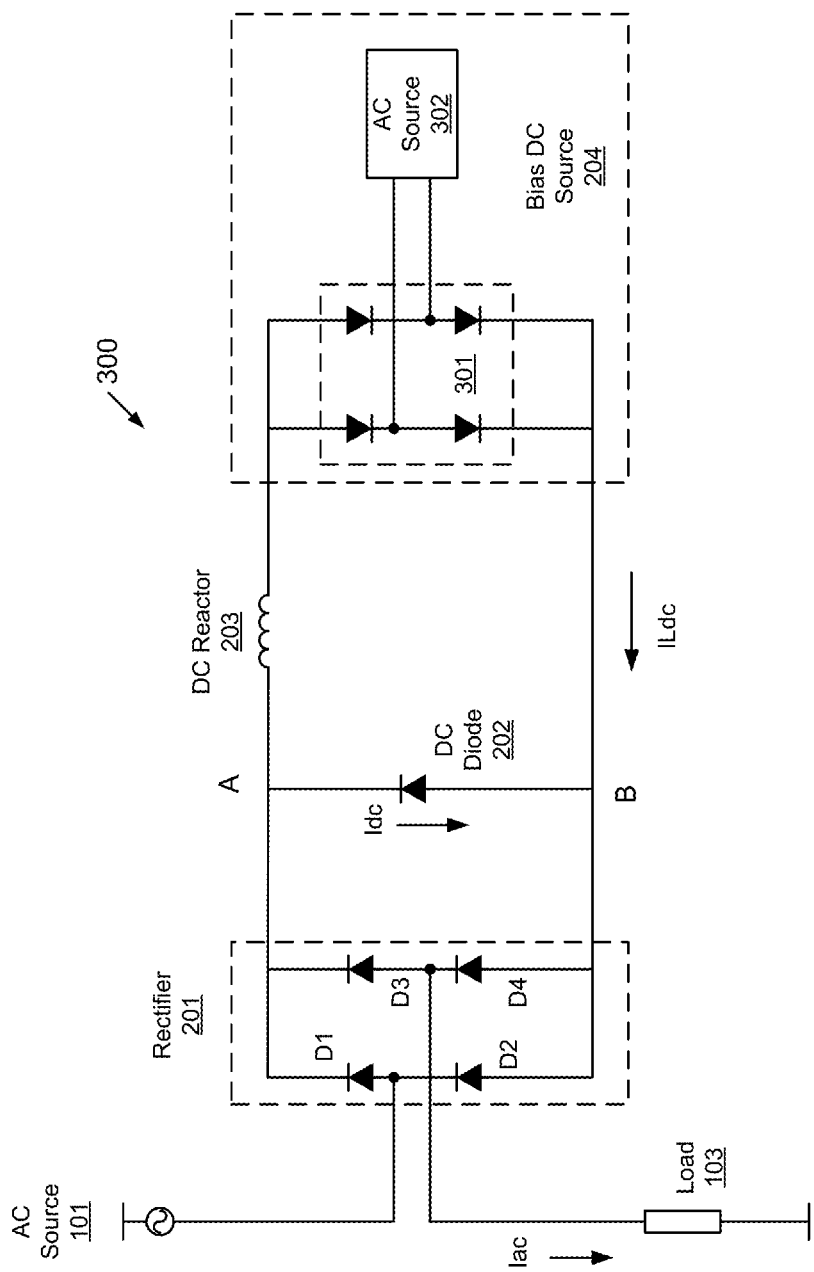
FIG. 3 is a schematic diagram illustrating an example of a fault current limiting circuit according to another embodiment of the invention.

FIG. 3 is a schematic diagram illustrating an example of fault current limiter circuit according to another embodiment of the invention. For example, FCL circuit 300 may be implemented as part of FCL 200 of FIG. 2. In one embodiment, FCL circuit 300 includes a rectifier having AC terminals and direct current (DC) terminals, where the AC terminals are to be coupled to the AC power source and the load. The FCL further includes a DC diode coupled in parallel across the DC terminals of the rectifier and a DC reactor in series with a bias DC source coupled to the DC diode. When an AC current drawn from the AC power source is less than a predetermined threshold (defined as the current limiting threshold), the DC diode is in a forward bias state to allow the AC current flowing to the load through the DC diode. When the AC current drawn from the AC power source is greater than or equal to the predetermined threshold, the DC diode is in a reverse bias state, forcing the AC current to flow to the load through the DC reactor. The DC reactor is to limit an amount of the AC current flowing through the DC reactor. The predetermined threshold may be represented by a bias current produced by bias DC source 204.

Referring to FIG. 3, a single phase bridge rectifier is utilized to represent rectifier 201 using a first, second, third, and fourth diodes D1-D4 to rectify the AC line current from AC to DC. An anode of the first diode D1 is coupled to a cathode of the second diode D2 to form a first AC terminal of rectifier 201. A cathode of the first diode D1 is coupled to a cathode of the third diode D3 to form a positive DC terminal of rectifier 201. An anode of the third diode D3 is coupled to a cathode of the fourth diode D4 to form a second AC terminal of rectifier 201. A cathode of the second diode D2 is coupled to a cathode of the fourth diode D4 to form a negative DC terminal of rectifier 201.

For rectifier 201, any suitable technology to convert AC current to DC current can be used. For example a single phase thyristor bridge rectifier using silicon-controlled rectifier (SCR) or a single way diode rectifier using a transformer with a neutral connection can be utilized. DC diode 202 is positioned across the DC terminals of diode bridge 201 with a cathode terminal coupled to a positive terminal of the DC terminals of diode bridge 201 and an anode terminal coupled to a negative terminal of the DC terminals of diode bridge 201. DC reactor 203 is coupled across the DC terminals of the diode bridge 201, in parallel with DC diode 202.

In the following description, for the purpose of illustration, it is assumed that the load is passive and as a result, the AC line current is substantially sinusoidal having a magnitude that is equal to the sinusoidal supply voltage divided by the magnitude of the supply impedance. However, the operation of embodiments of the invention is not limited to AC sinusoidal current. It can also operate in the similar fashion described in this application with the same or similar fundamental principles substantially regardless of the waveform shape of AC supply voltage or AC line current.

Referring back to FIG. 3, main rectifier 201 is considered to produce a DC current from an AC current at its poles that is positive in magnitude and flows only in one direction. The peak value of the DC current is identical to the peak value of the AC line current. The fundamental frequency of the DC current is twice the value of the fundamental frequency of the AC current. The period of the DC current is half the time of the period of the AC current.

Figure 4A:
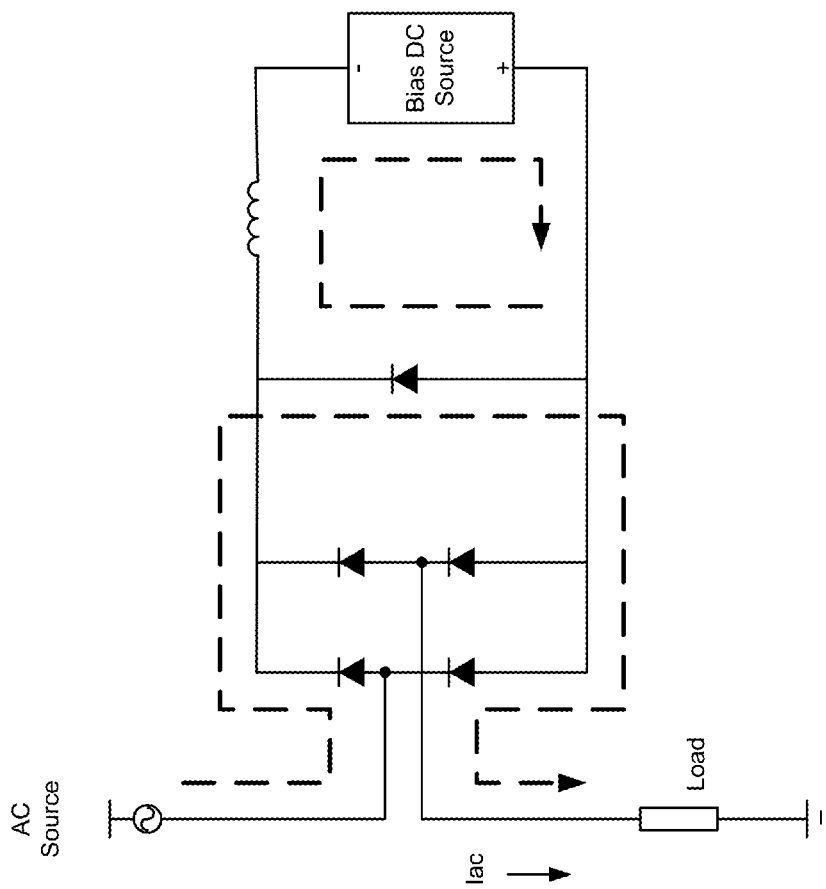
FIGS. 4A and 4B are schematic diagrams illustrating a fault current limiting circuit operating in uninhibited and inhibited modes according to certain embodiments of the invention.
Figure 4B:
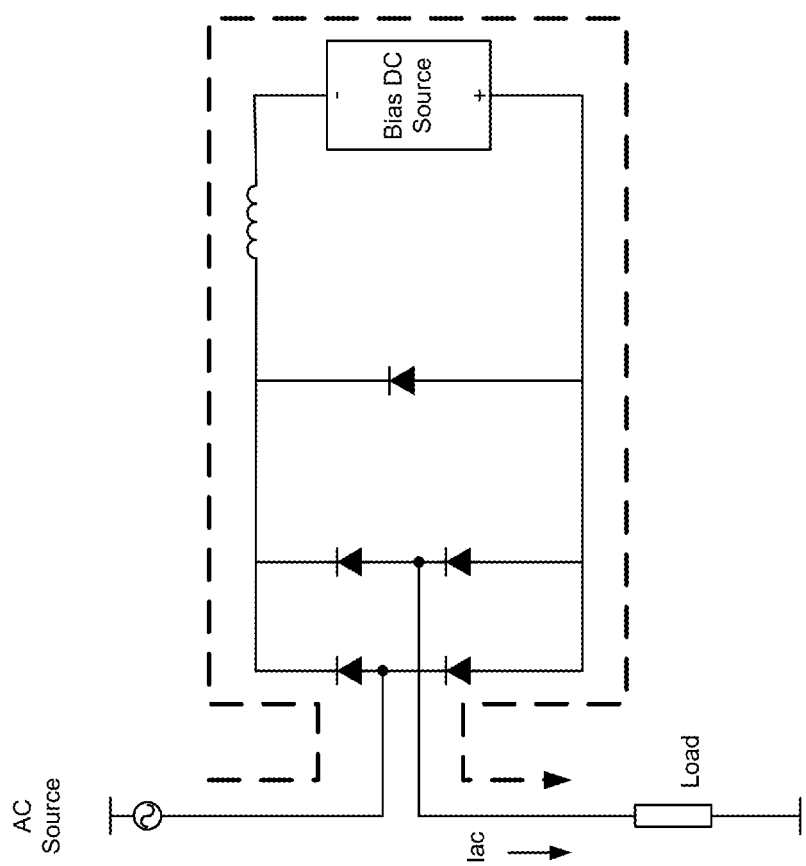

An embodiment of the invention is to impose no voltage drop to the AC supply 101 during uninhibited mode of operation, but when an overload occurs (the limiting current threshold set by the user is exceeded) the FCL 300 changes state to inhibition mode and imposes the maximum impedance to AC supply 101. In one embodiment, this can be achieved by the connection of bias DC current source 204 in series with DC reactor 203. The bias DC current source produced by bias DC source 204 is to permanently forward bias DC diode 202 with a DC current of magnitude desired by the user, which may be configured by setting a proper output level (e.g., current or voltage level) of bias DC source. The DC bias source can be considered passive as the DC current does not need to be controlled accurately for the application of FCL. For an instantaneous load current in a steady state or transient state that is less than the magnitude of the DC bias source current 204, the poles of rectifier 201 will be short circuited by the forward bias DC diode 202 and FCL 300 will not substantially drop any voltage across the AC terminals of rectifier 201, as shown in FIG. 4A. For an instantaneous load current in a steady state or transient that is greater than the magnitude of the DC bias source current, DC diode 202 will reverse bias and the current from rectifier 201 is forced to flow into DC reactor 203, which causes a voltage drop to appear across the AC terminals of rectifier 201 and the AC current is limited, as shown in FIG. 4B. When DC diode 202 is in the forward bias state, DC diode 202 is turned on to allow the AC current flowing through. When DC diode 202 is in the reverse bias state, DC diode 202 is shut off to block the AC current flowing through, which forces the current flowing through DC reactor 203.

According to one embodiment, the load (103) current threshold at which DC diode 202 becomes reverse bias is equal to the bias current generated by bias DC source 204. Bias DC source 204 may include a three phase or single phase controlled rectifier or an uncontrolled diode rectifier coupled to an isolation transformer that is typically an order of magnitude smaller in apparent power rating of the load. In one embodiment, bias DC source 204 includes rectifier 301 and AC source 302. Rectifier 301 can be any kind of AC/DC circuits as described above. In this example, rectifier 301 is a bridge rectifier having AC terminals coupled to AC source 302. The positive DC terminal of rectifier 301 is coupled to an anode terminal of DC diode 202 and the negative DC terminal of rectifier 201, forming node B. The negative DC terminal of rectifier 301 is coupled to the second terminal of DC reactor 203. The first terminal of DC reactor 203 is coupled to the cathode terminal of DC diode 202 and positive DC terminal of rectifier 201, forming node A.

FCL 300 can operate in an uninhibited or inhibited condition. An uninhibited condition refers to that the peak of the AC current drawn by the load (supplied by the voltage source) is below the bias threshold set by the user, for example, via bias DC source 204. In this uninhibited state the instantaneous magnitude of the current generated by DC bias source 204 is always above the instantaneous value of the load current. This means that the net DC current flowing through DC diode 202 connected across the poles of rectifier 201 is always positive and the state of DC diode 202 is always forward bias, therefore short circuiting the DC terminals of rectifier 201. The AC current is rectified by rectifier 201 to the DC current, which flows substantially uninhibited through DC diode 202 to load 103, as shown in FIG. 4A.

An inhibited condition refers to that the peak of the AC current drawn by the load is above the bias threshold set by the user. In the inhibited condition, DC diode 202 is reverse biased and no current flows through it. The DC current from rectifier 201 has a positive slope and flows into DC reactor 203 and charges DC reactor 203 until the peak DC current is reached, as shown in FIG. 4B. Note that DC reactor 203 can also be positioned between node B and the positive terminal of bias DC source 204.

Figure 5A:
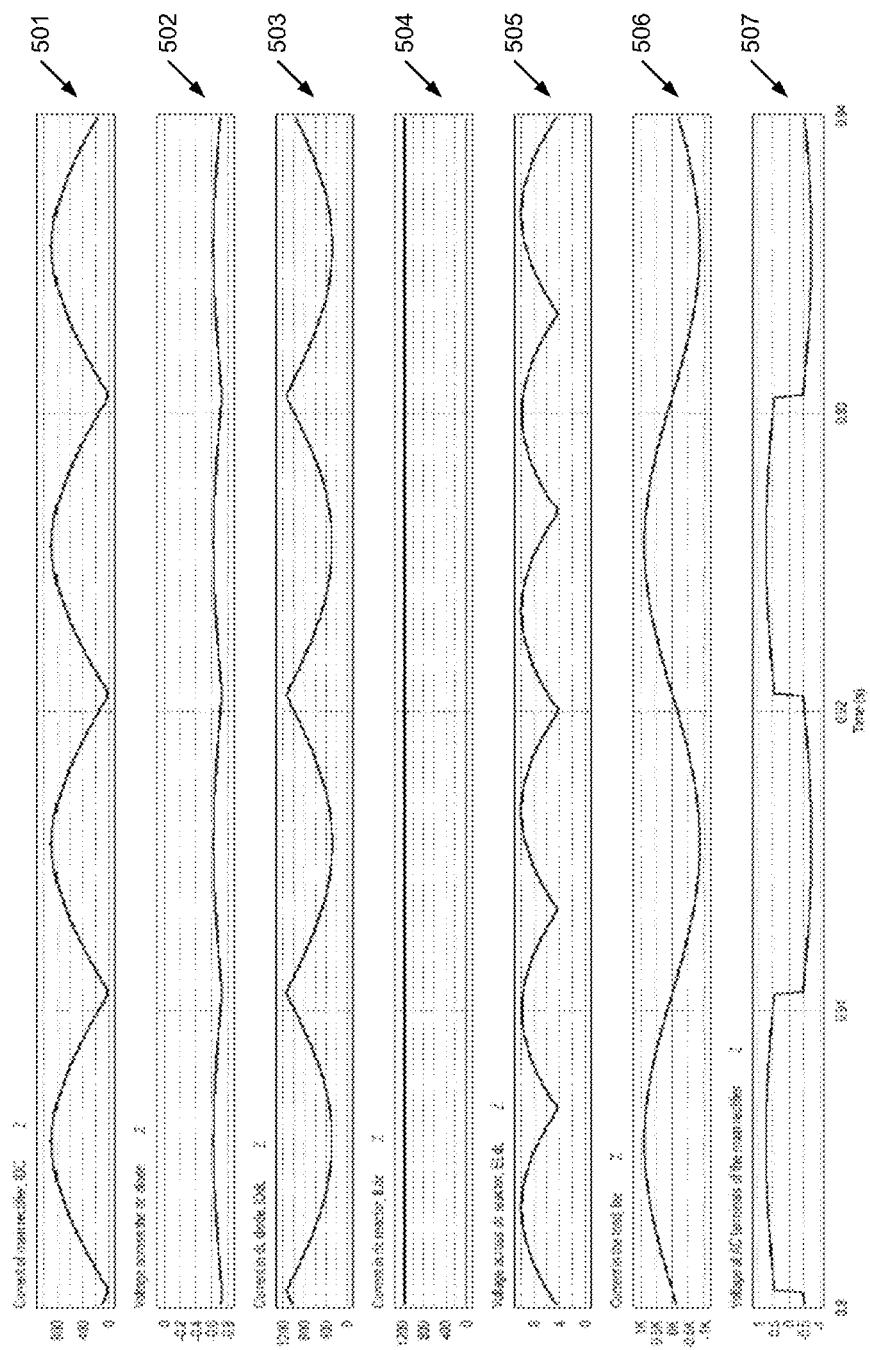
FIGS. 5A and 5B are waveforms of certain components of a fault current limiting circuit in uninhibited and inhibited modes according to certain embodiments of the invention.

FIG. 5A shows waveforms of certain components of FIG. 3 operating in an uninhibited condition according to one embodiment of the invention. Referring to FIG. 5A, waveform 501 represents the current through rectifier 201. Waveform 502 represents the reverse voltage, cathode to anode, across DC diode 202. Waveform 503 represents the current through DC diode 202. Waveform 504 represents the current through DC reactor 203. Waveform 505 represents the voltage across the DC reactor 203. Waveform 506 represents the current through load 103. Waveform 507 represents the voltage across the AC terminals of rectifier 201.

Figure 5B:
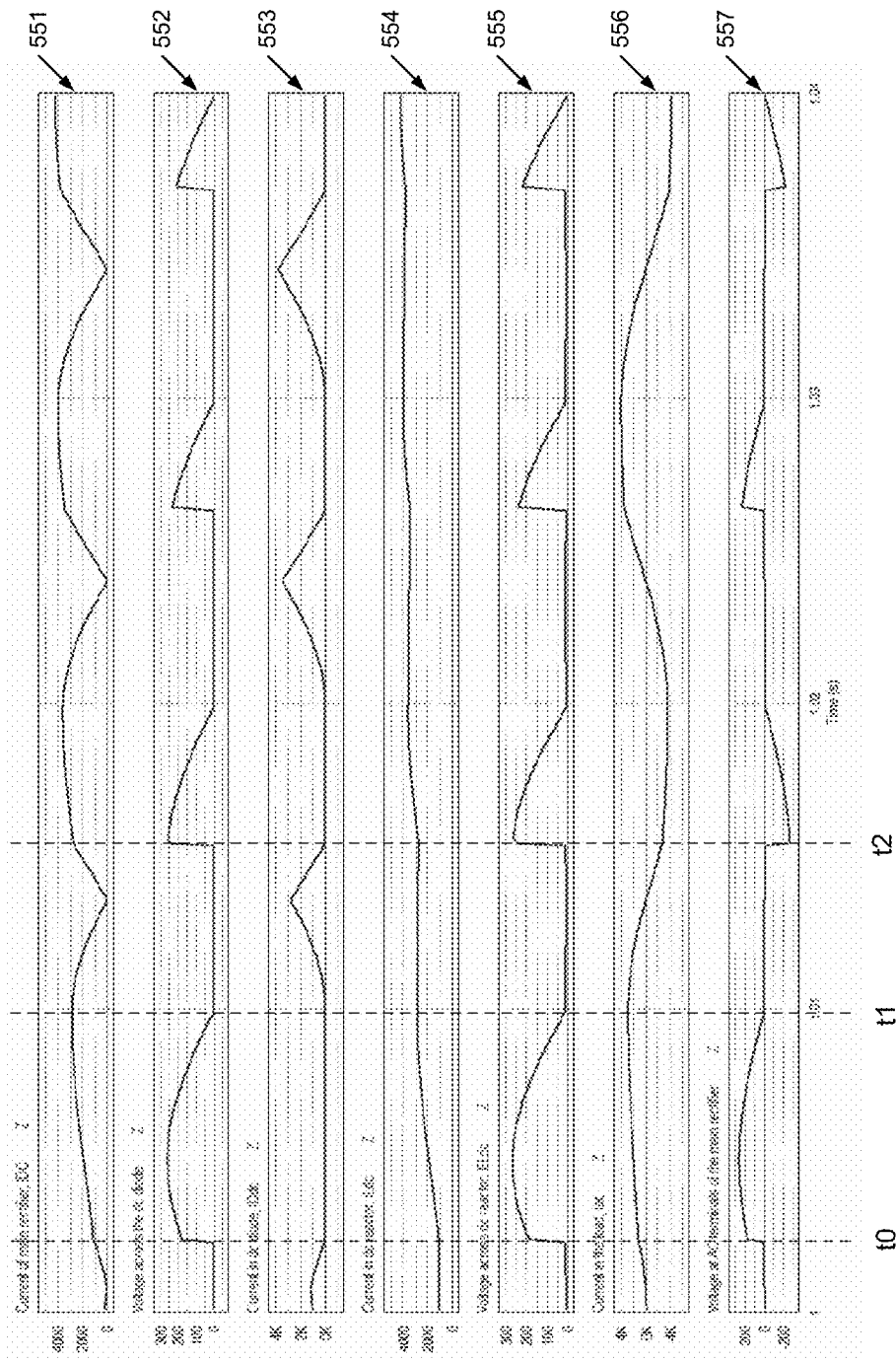

FIG. 5B shows waveforms of certain components of FIG. 3 operating in an inhibited condition according to one embodiment of the invention. Referring to FIG. 5B, waveform 551 represents the current through rectifier 201. Waveform 552 represents the reverse voltage, cathode to anode, across DC diode 202. Waveform 553 represents the current through DC diode 202. Waveform 554 represents the current through DC reactor 203. Waveform 555 represents the voltage across the DC reactor 203. Waveform 556 represents the voltage across load 103. Waveform 557 represents the voltage across the AC terminals of rectifier 201.

From time t0 and time t1, the cathode-anode voltage of DC diode 202 is positive (as shown in waveform 552) and therefore is reverse biased and substantially no current flows through it (as shown in waveform 553). During the interval t0 to t1 the DC current from rectifier 201 flows through DC reactor 203 (as shown in waveform 554). During time interval t1 to t2, DC reactor 203 is discharging.

After the peak DC current is reached the slope of the DC current becomes negative and the voltage across the terminals of DC reactor 203 reverses and the inductor discharges into DC diode 202, forward biasing DC diode 202 and short circuiting the poles of rectifier 201. The operation of DC diode 202 in this part of the cycle is similar to the operation of a free-wheeling diode in a conventional rectifier that provides a path for discharge of the energy stored in the magnetic field of the dc reactance. The magnitude of the voltage reversal is limited to the forward voltage of DC diode 202. The discharge time constant is equal to the DC reactance divided by the path of resistance of the discharge circuit. The discharge circuit resistance can be approximately considered to be the resistance of the DC reactance and hence related to the quality factor of the DC reactance. For a typical practical quality factor equal to 50, DC reactor 203 discharges relatively slowly through DC diode 202 with a time constant, tau, which is approximately an order of magnitude greater than the DC period. Note that the amount of current discharge during the time t1 to t2 is relatively small (see waveform 554)

While DC reactor 203 is discharging, DC diode 202 is forward biased and therefore the poles of rectifier 201 are considered to be short circuited (with only DC diode 202 resistance providing impedance to rectifier 201). The DC current from rectifier 201 during this time flows through DC diode 202 and is not impeded by DC reactor 203.

At time t1 the DC current from rectifier 201 is at its peak and begins to decrease in magnitude and its slope becomes negative. The energy stored in the magnetic field of the dc reactor begins to discharge through the dc diode at a rate governed by the time constant of the electrical circuit. The polarity of the voltage across DC reactor 203 reverses and DC diode 202 becomes forward bias (as shown in waveform 552) and begins to conduct current (as shown in waveform 553). The magnitude of the instantaneous current in DC diode 202 during time t1 and t2 is governed by Kirchoff's current law and is determined by the rule that the algebraic sum of the currents entering node A of FIG. 3 is equal to zero. As mentioned above, the bias DC source is optional and the techniques described herein can be applied with or without the bias DC source.

Figure 6:
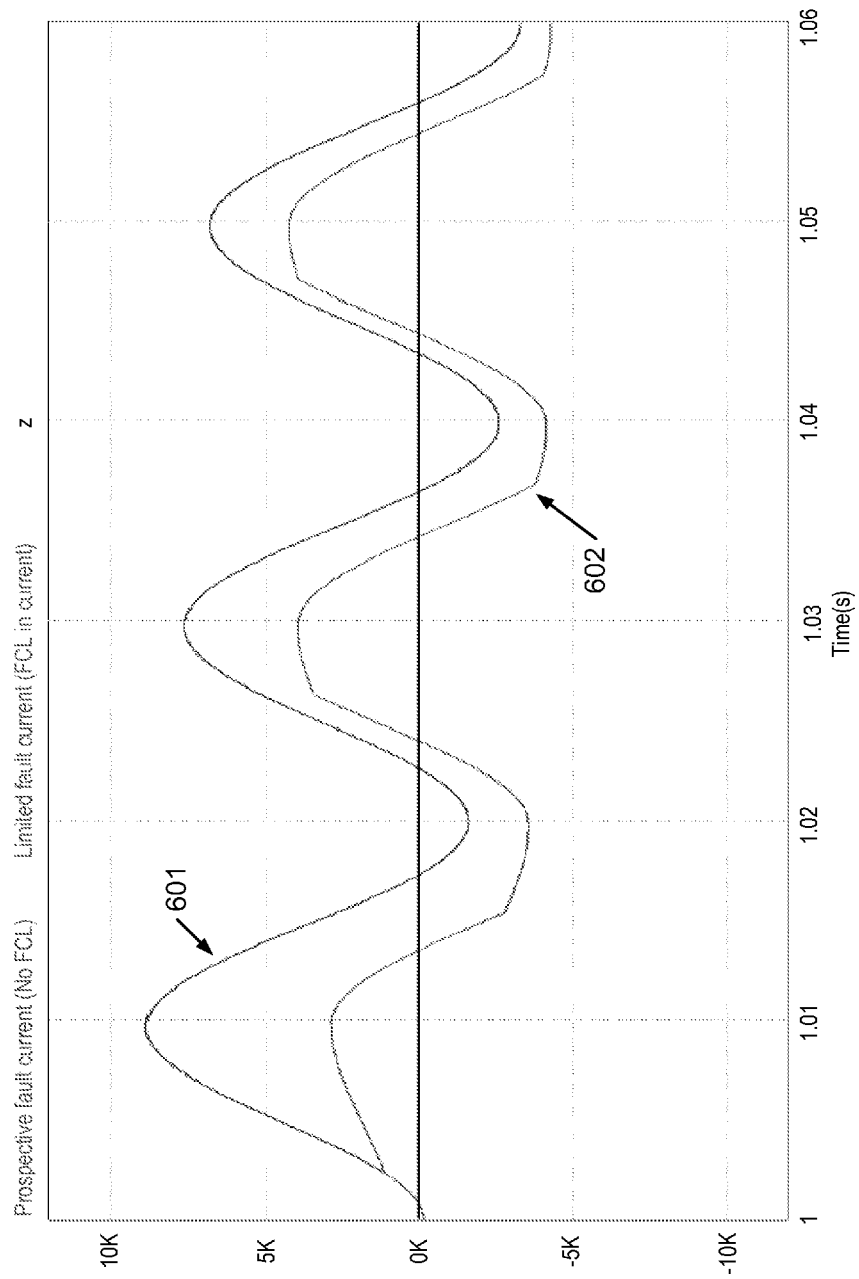
FIG. 6 shows waveforms of a fault current limiting circuit with and without a bias DC source.

FIG. 6 shows a comparison of the AC fault current from the supply without the FCL (as shown in waveform 601) and with the FCL (as shown in waveform 602) in the circuit. As can be seen the peak asymmetric fault current is substantially diminished from the prospective peak, and the RMS value is less than the prospective RMS for a number of cycles. Optional added passive circuitry could be used in addition to the FCL such as fuses or mechanical breakers that open the circuit to prevent a buildup of RMS fault current.

Note that the FCL can operate at any user defined DC bias current, including zero amperes bias current. In this mode of operation the FCL 102 of FIG. 1 is considered to always be present in the circuit and inhibiting the AC current passing from the source to the load. The mode of operation is identical to the inhibited mode as described above but with the bias DC source current level set to zero amperes. The impact of the FCL being always present in the circuit depends on the design of the components, but there will always be an AC voltage drop across the terminals of the FCL due to current passing through reactor 203 for a part of the cycle, hence a true uninhibited state will not occur.

Figure 7A:
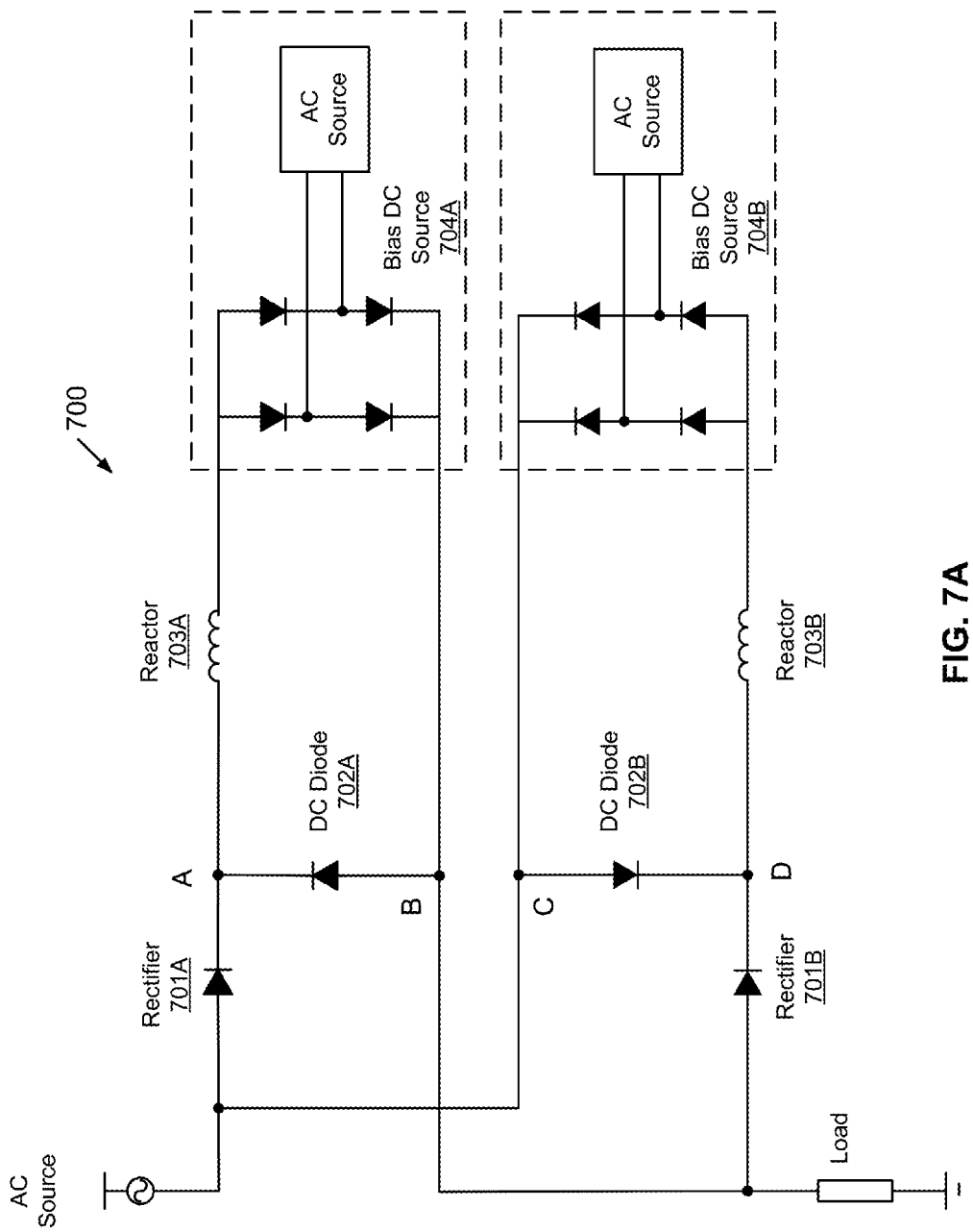
FIGS. 7A and 7B are schematic diagrams illustrating an example of a fault current limiting circuit according to some embodiments of the invention.

FIG. 7A is a schematic diagram illustrating an example of a fault current limiting circuit according to another embodiment of the invention. Referring to FIG. 7A, the main rectifier topology has been changed from the conventional bridge rectifier shown in FIG. 3 to a single way connection. In this embodiment, there is only one diode 701A in series is needed to rectify the positive power cycle of the AC current from the AC source and one diode 701B in series is required to rectify the negative power cycle of the AC current from the AC source. There is DC diode 702A, DC reactor 703A, and DC bias source 704A required for the positive rectification diode 701A, and DC diode 702B, DC reactor 703B, and DC bias source 704B required for negative rectification diode 701B. The single way connection has the advantage of allowing the user to configure different limitation magnitudes and thresholds between the positive half and negative half of the power cycle during an inhibition mode, for example, by configuring bias DC sources 704A and 704B, respectively or by specifying different DC reactor inductance for 703A and 703B.

Specifically, referring to FIG. 7A, AC source 101 is coupled to the anode terminal of rectifier 701A, the anode terminal of DC diode 702B, and the negative terminal of bias DC source 704B, forming node C. The cathode terminal of rectifier 701A is coupled to the cathode terminal of DC diode 702A and the first terminal of reactor 703A, forming node A. The second terminal of reactor 703A is coupled to the negative terminal of bias DC source 704A. Load 103 is coupled to the anode terminal of DC diode 702A, the anode terminal of rectifier 701B, and the positive terminal of bias DC source 704A, forming node B. The cathode terminal of rectifier 701B is coupled to the cathode terminal of DC diode 702B and the first terminal of reactor 703B, forming node D. The second terminal of reactor 703B is coupled to the positive terminal of bias DC source 704B. Note that the rectifiers used in bias DC sources 704A and 704B can be any kind of AC/DC circuits, such as, for example, a four-diode bridge as shown in FIG. 7A.

According to one embodiment, during the positive half of a power cycle, when operating in an uninhibited mode, the AC current flows from AC source 101, rectifier 701A, and DC diode 702A to load 103. During the positive half of a power cycle, when operating in an inhibited mode, the AC current flows from AC source 101, rectifier 701A, reactor 703A, and bias DC source 704A to load 103. During the negative half of a power cycle, when operating in an uninhibited mode, the AC current flows from AC source 101, DC diode 702B, and rectifier 701B to load 103. During the negative half of a power cycle, when operating in an inhibited mode, the AC current flows from AC source 101, bias DC source 704B, reactor 703B, and rectifier 701B to load 103.

According to one embodiment, the FCL 700 includes a first current limiting circuit to limit the AC current during a positive half of a power cycle of the AC power source and a second current limiting circuit to limit the AC current during a negative half of the power cycle of the AC power source. The first current limiting circuit includes a first rectifier, a first DC diode, and a first DC reactor coupled to the first rectifier and the first DC diode. The second current limiting circuit includes a second rectifier, a second DC diode, and a second DC reactor coupled to the second rectifier and the second DC diode. During the positive half of the power cycle when an AC current drawn from the AC power source is less than a first predetermined bias current, the first DC diode is in a forward bias state to allow the AC current flowing to the load through the first DC diode.

In one embodiment, during the positive half of the power cycle when the AC current drawn from the AC power source is greater than or equal to the first predetermined bias current, the first DC diode is in a reverse bias state, forcing the AC current to flow to the load through the first DC reactor. The first DC reactor is to limit an amount of the AC current flowing through the DC reactor. During the negative half of the power cycle when an AC current drawn from the AC power source is less than a second predetermined bias current, the second DC diode is in a forward bias state to allow the AC current flowing to the load through the second DC diode. During the negative half of the power cycle when the AC current drawn from the AC power source is greater than or equal to the second predetermined bias current, the second DC diode is in a reverse bias state, forcing the AC current to flow to the load through the second DC reactor. The second DC reactor is to limit an amount of the AC current flowing through the DC reactor.

The FCL further includes a first bias DC source coupled to the first DC diode and the first DC reactor to provide the first predetermined bias current and a second bias DC source coupled to the second DC diode and the second DC reactor to provide the second predetermined bias current. In one embodiment, the first and second predetermined bias currents are different.

Figure 7B:
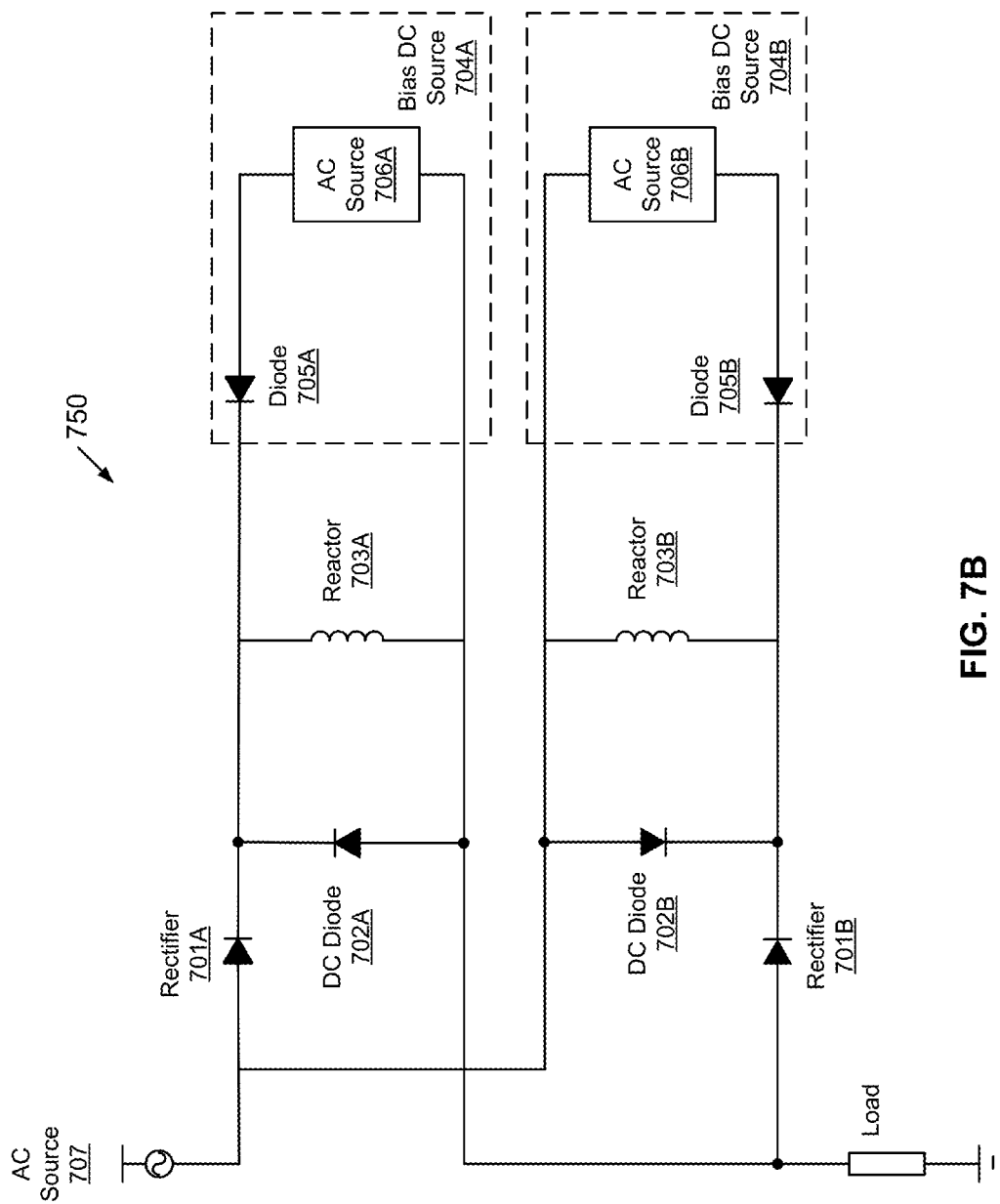

According to one embodiment, the rectifier bridge of bias DC sources 704A and 704B may be implemented using a single diode as shown in FIG. 7B. Referring to FIG. 7B, in this example, reactor 703A is coupled to DC diode 702A in parallel; reactor 703B is coupled to DC diode 702B in parallel. DC bias source 704A is comprised of diode 705A and AC source 706A connected in series. DC bias source 704B is comprised of diode 705B and AC source 706B connected in series. AC source 706A and AC source 706B are 180 degrees out of phase with AC source 707 (as shown in waveforms 1001 and 1006 of FIG. 10). AC sources 706A and 706B are of substantially equal frequency as AC source 707. A positive voltage half cycle of AC source 707 corresponds to a negative voltage half cycle of 706A and 706B. A negative voltage half cycle of AC source 707 corresponds to a positive voltage half cycle of 706A and 706B.

Figure 10:
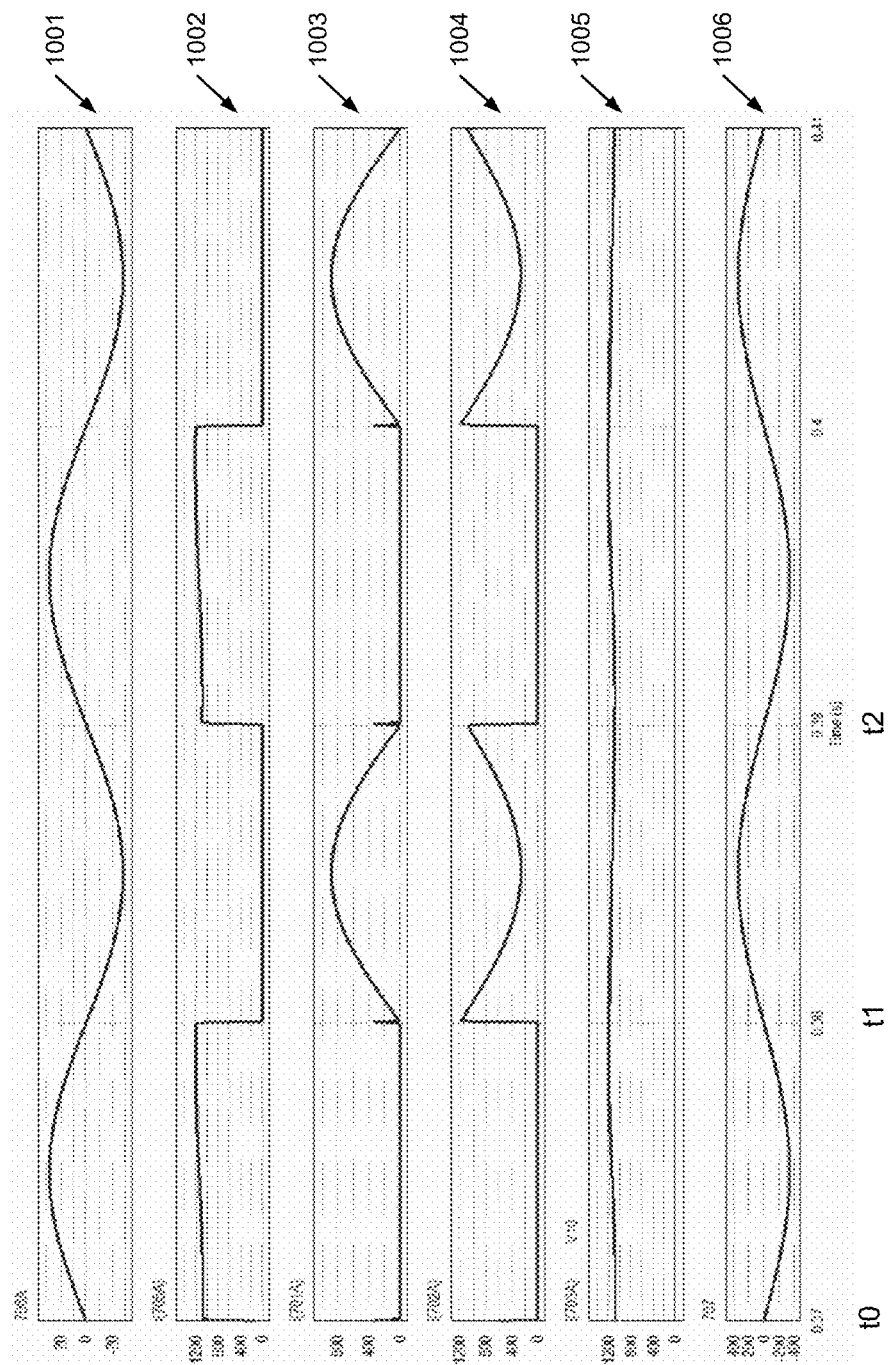
FIGS. 10-13 are waveforms of certain components of FIG. 7B.

During the positive voltage half cycle of AC source 706A, as indicated in FIG. 10 as between time t0 and t1, diode 705A is forward bias and current flows from source 706A into reactor 703A. Waveform 1002 represents diode 705A current. Waveform 1005 represents reactor 703A current. AC source 707 (as shown in waveform 1006) is negative in magnitude between time t0 and t1 therefore diodes 701A and 702A do not conduct.

During the negative voltage half cycle of AC source 706A, time t1 to t2 in FIG. 10, diode 705A is reverse bias and current does not flow through it (as shown in waveform 1002). The current from AC source 706A is substantially zero. The voltage across reactor 703A reverses in polarity and forward biases diode 702A and discharges current through the diode 702A (as shown in waveforms 1004 and 1005). The AC source 707 is positive in magnitude and diode 701A is forward bias and current flows through it (as shown in waveform 1003). FIG. 10 represents FCL 750 for uninhibited conditions. Under the power circuit conditions that the peak load current is less in magnitude than the reactor 703A discharge current (and by implication the bias DC source current of 704A) the AC current flows from the AC source 707 through diode 701A and through diode 702A and into the load. The FCL 750 does not inhibit the flow of current from source 707 to the load.

Figure 11:
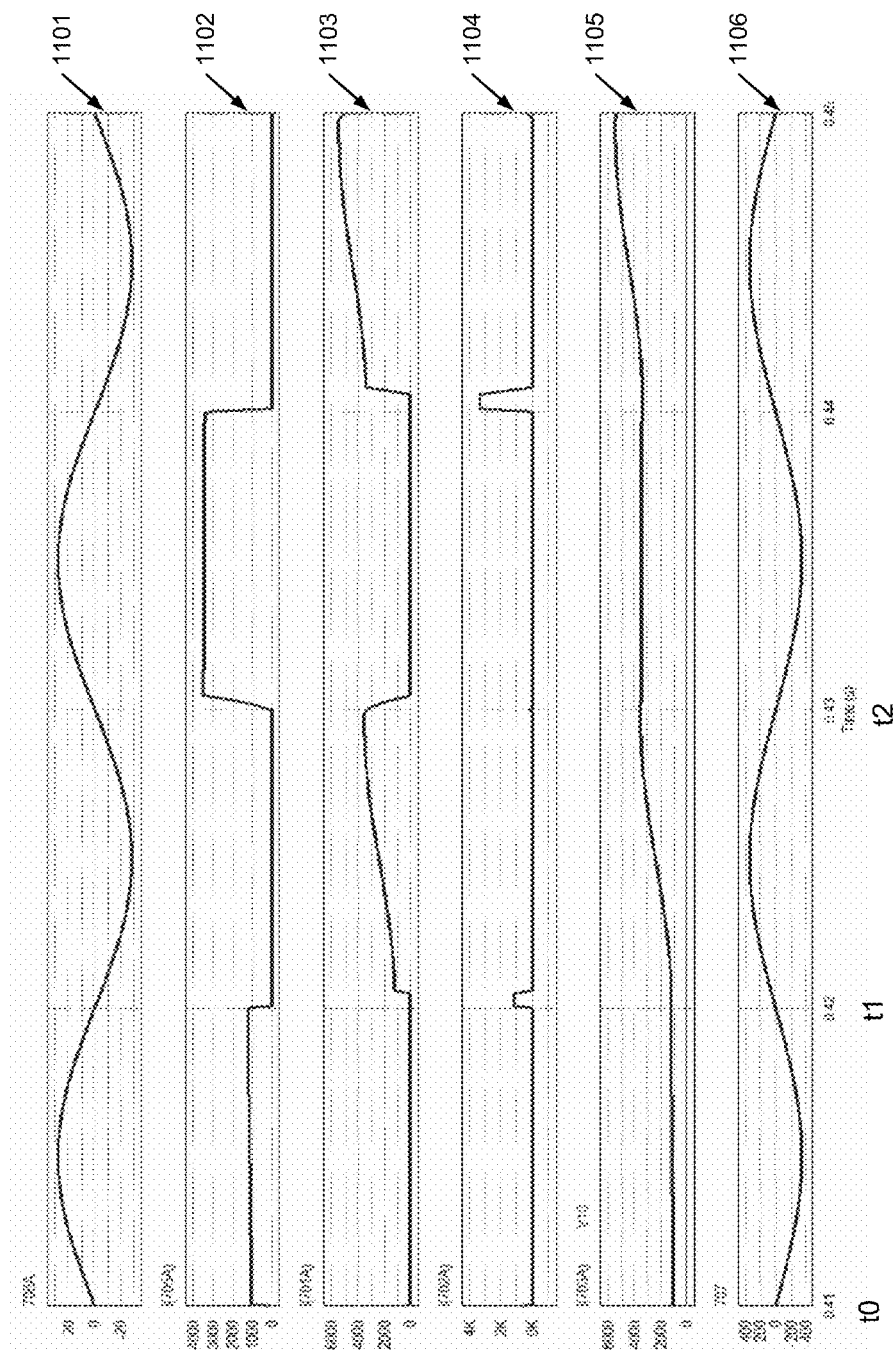

FIG. 11 represents FCL 750 for inhibited conditions. Under the power circuit conditions that the peak load current is higher than the reactor 703A discharge current through diode 702A (as shown in waveform 1104), due to a fault current condition in the load for example, diode 702A is in reverse bias and its current is substantially zero for the duration of the fault. The AC current from source 707 flows through diode 701A (as shown in waveform 1103) into reactor 703A (as shown in waveform 1105) and into the load. The FCL 750 inhibits the flow of current from source 707 to the load in this condition.

Figure 12:
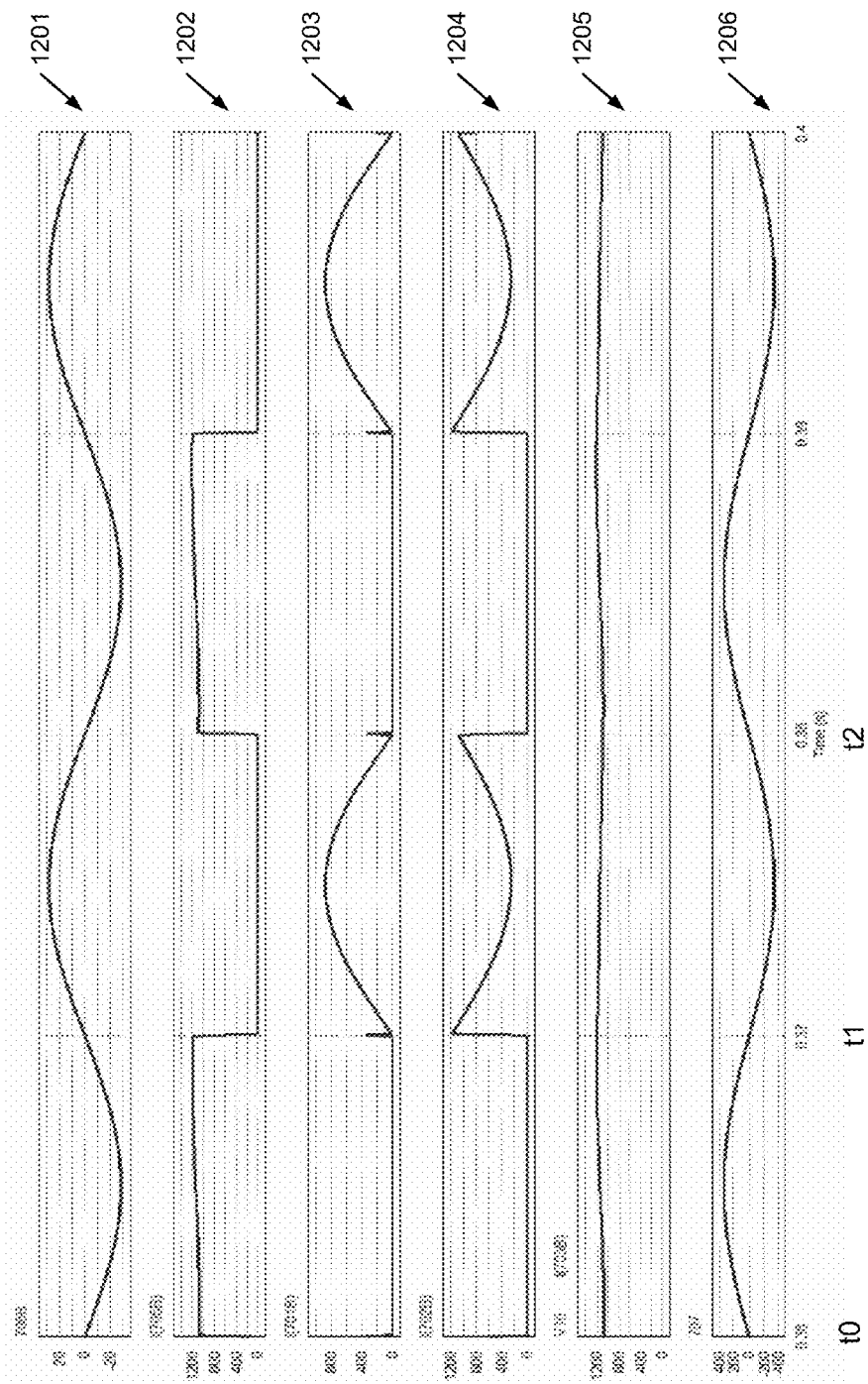

During the negative voltage half cycle of AC source 706B (as shown in waveform 1201), indicated in FIG. 12 as between time t0 and t1, diode 705B is forward bias and current flows from source 706B into reactor 703B. Referring to FIG. 12, waveform 1202 represents diode 705B current and waveform 1205 represents reactor 703B current. AC source 707 (as shown in waveform 1206) is positive in magnitude therefore diodes 701B (as shown in waveform 1203) and 702B (shown in waveform 1204) do not conduct.

During the positive voltage half cycle of AC source 706B, time t1 to t2 as shown in FIG. 12, diode 705B is reverse bias and current does not flow through it (as shown in waveform 1202). The current from AC source 706B is substantially zero. The voltage across reactor 703B reverses in polarity and forward biases diode 702B and discharges current through the diode 702B (as shown in waveforms 1204 and 1205). The AC source 707 (as shown in waveform 1206) is negative in magnitude and diode 701B is forward bias and current flows through it (as shown in waveform 1203). FIG. 12 represents FCL 750 for uninhibited conditions. Under the power circuit conditions that the peak load current is less in magnitude than the reactor 703B discharge current (and by implication the bias DC source current of 704B) the AC current flows from the AC source 707 through diode 701B and through diode 702B and into the load. The FCL 750 does not inhibit the flow of current from source 707 to the load.

Figure 13:
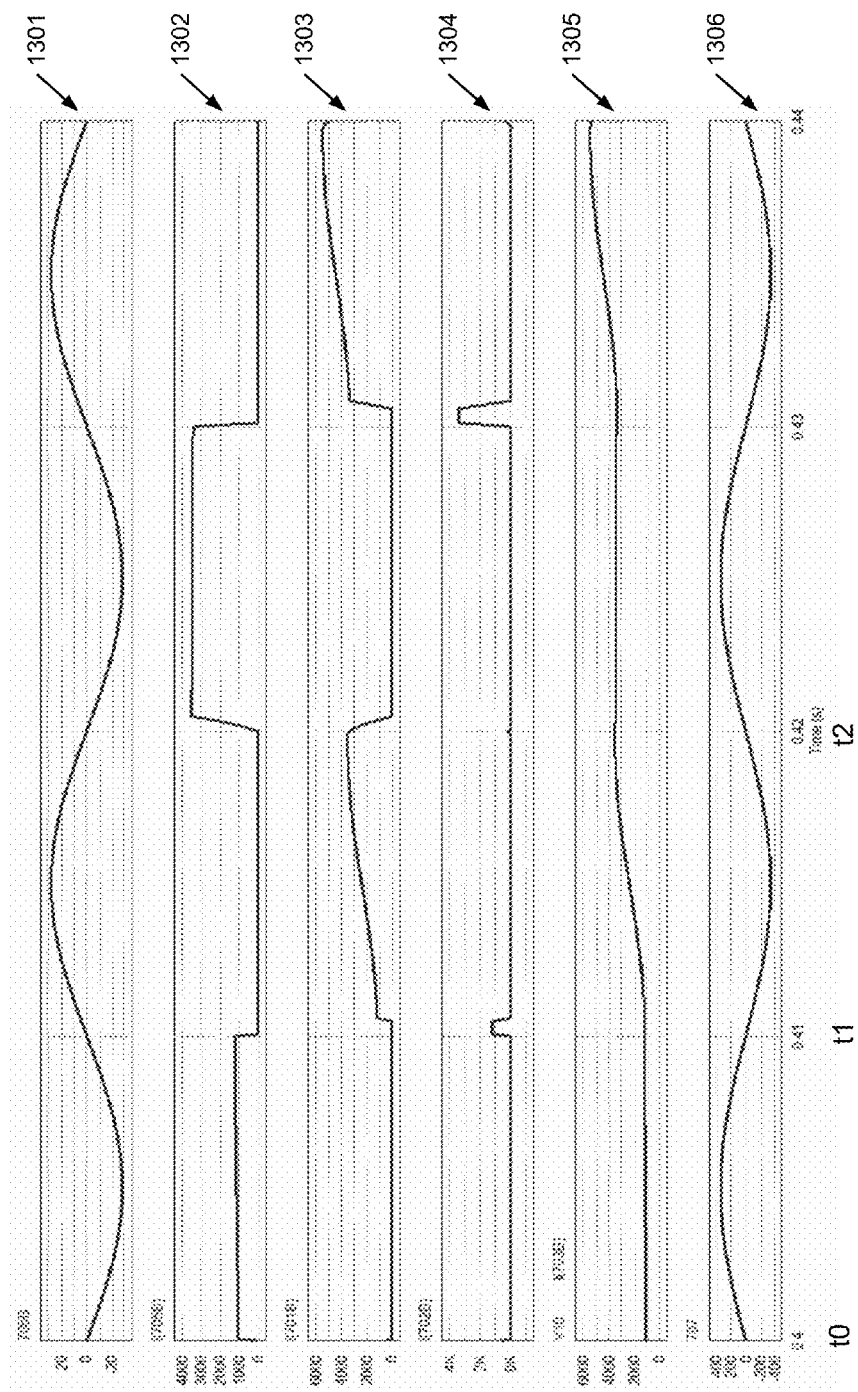

FIG. 13 represents FCL 750 for inhibited conditions. Under the power circuit conditions that the peak load current is higher than the reactor 703B discharge current through diode 702B (as shown in waveform 1304), due to a fault current condition for example, diode 702B is in reverse bias and its current is substantially zero for the duration of the fault current. The AC current from source 707 flows through diode 701B (as shown in waveform 1303) into reactor 703B (as shown in waveform 1305) and into the load. The FCL 750 inhibits the flow of current from source 707 to the load in this condition.

In the event that large suppression of peak or RMS fault current for a long duration is required by the user, according to one embodiment, the magnitude of DC reactor 203 of FCL 300 or FCL 700 as shown in FIGS. 2-3 and 7A-7B can become very large, especially if an air cored design of the reactor is a requirement. To alleviate this problem an interphase transformer 705 can be fitted to the single way design circuit, as shown in FIG. 8, such that the voltage imposed normally on the DC reactor 703 during a fault is diminished and hence its sizing is reduced for the same level of fault current limitation.

Figure 8:
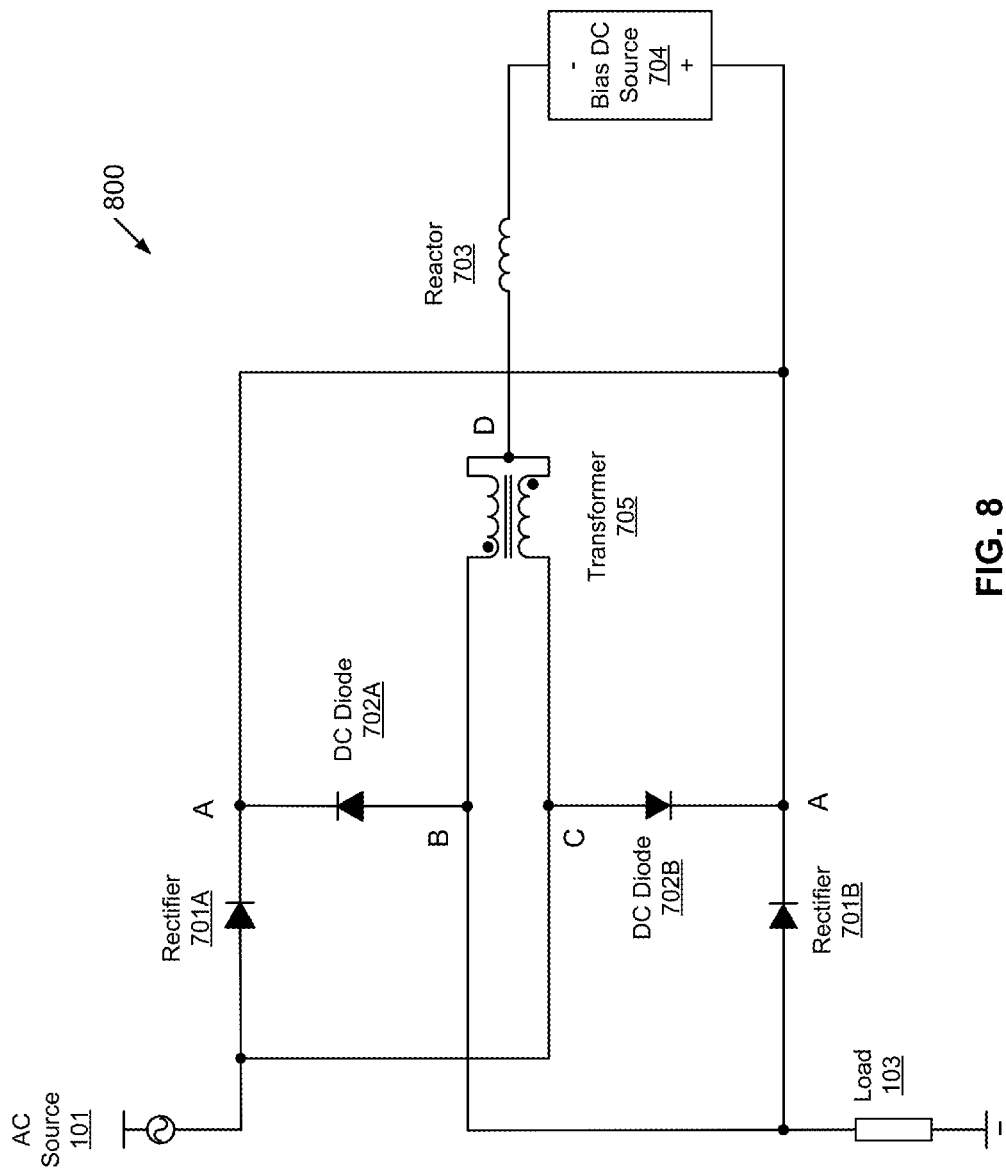
FIG. 8 is a schematic diagram illustrating an example of a fault current limiting circuit according to another embodiment of the invention.

FIG. 8 is a schematic diagram illustrating a single way design circuit with an interphase transformer according to one embodiment of the invention. Referring to FIG. 8, in this embodiment, a transformer 705 is utilized between reactor 703 and DC diodes 702A-702B. As a result, a single DC reactor 703 and bias DC source 704 are utilized. Referring to FIG. 8, the AC source is coupled to an anode of rectifier 701A, an anode of DC diode 702B, and a first terminal of a first winding of transformer 705, forming node C. The load is coupled to an anode of DC diode 702A, an anode of rectifier 701B, and a second terminal of a second winding of transformer 705, forming node B. A first terminal of the second winding of transformer 705 is coupled to a second terminal of the first winding of transformer 705 and a first terminal of reactor 703, forming node D. A second terminal of DC reactor 703 is coupled to a negative terminal of bias DC source 704. A cathode of rectifier 701A is coupled to a cathode of DC diode 702A, a cathode of DC diode 702B, a cathode of rectifier 701B, and a positive terminal of bias DC source 704, forming node A.

Figure 9:
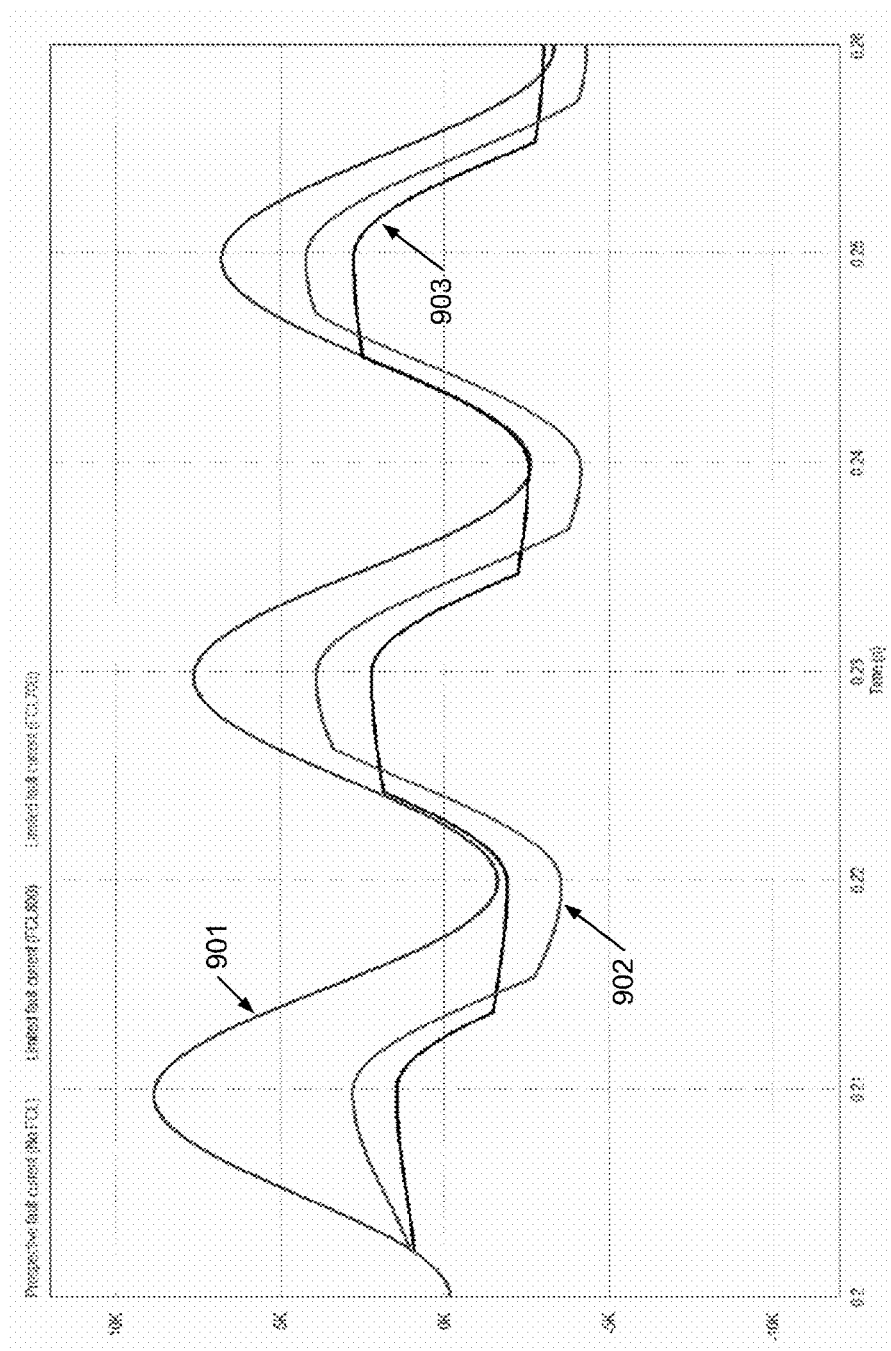
FIG. 9 shows waveforms of fault current limiting circuits in FIGS. 7A-7B and 8 with and without a bias DC source.

FIG. 9 shows the waveforms of the performance of the limiter in comparison with the FCL 700 and uninhibited prospective fault current. Waveform 901 represents the AC current without an FCL circuit. Waveform 902 represents the AC current with an FCL circuit as shown in FIGS. 7A and/or 7B. Waveform 903 represents the AC current with an FCL circuit as shown in FIG. 8. As can be seen the AC current from the AC source 101 delivered during fault conditions is greatly diminished for the same size and rating of all components, the only difference is that an interphase transformer has been added to the circuit. Due to the single way connection AC voltage across the interphase transformer winding is symmetrical AC ensuring that it will not saturate under any conditions.

Figure 14:
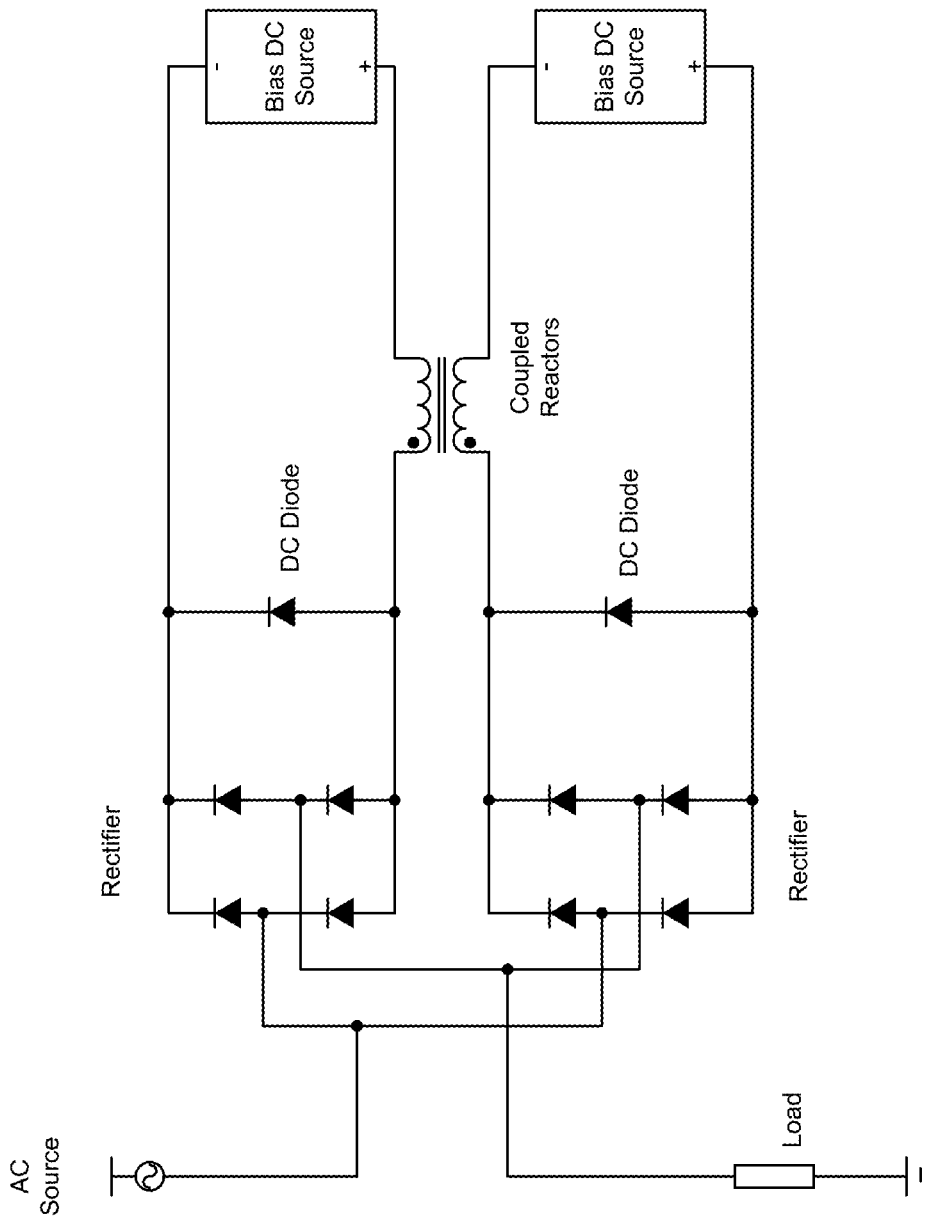
FIG. 14 is a schematic diagram illustrating an example of a fault current limiting circuit according to another embodiment of the invention.

In the embodiment shown in FIG. 14, two FCL circuits are connected in parallel and share the load current substantially equally. All comparable components in each limiting circuit are substantially identical or similar. In this embodiment, the DC diodes are replaced with coupled DC reactors, coupled inductors or a transformer. The limiting reactor coils for each FCL are linked by a magnetic circuit. This circuit has the advantage of allowing a smaller DC reactor sizing and hence an improvement of the efficiency of the circuit.

Note that some or all of the diodes or rectifiers described above can be replaced with any kinds of AC/DC converting circuits such as a thyristor or the like. Also note that any of the DC reactors described above can also be implemented using coupled inductors, similar to a transformer.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A fault current limiter for limiting a fault current of an alternate current (AC) power source drawn by a load, the fault current limiter comprising:
    a rectifier having AC terminals and direct current (DC) terminals, the AC terminals to be coupled to the AC power source and the load;
    a DC diode coupled in parallel across the DC terminals of the rectifier; and
    a DC reactor coupled to the DC diode, wherein when an AC current drawn from the AC power source is less than a predetermined threshold, the DC diode is in a forward bias state to allow the AC current flowing to the load through the DC diode, wherein when the AC current drawn from the AC power source is greater than or equal to the predetermined threshold, the DC diode is in a reverse bias state, forcing the AC current to flow to the load through the DC reactor, and wherein the DC reactor is to limit an amount of the AC current flowing through the DC reactor; and
    a bias DC source coupled to the DC reactor and the DC diode, wherein the bias DC source is to provide a bias DC current defining the predetermined threshold.

2. The fault current limiter of claim 1, wherein a cathode of the DC diode is coupled to a positive DC terminal of the rectifier and a first terminal of the DC reactor, and wherein an anode of the DC diode is coupled to a negative DC terminal of the rectifier and a second terminal of the DC reactor.

3. The fault current limiter of claim 1, wherein when the DC diode is in the forward bias state, the DC diode is turned on to allow the AC current flowing through, and wherein when the DC diode is in the reverse bias state, the DC diode is shut off to block the AC current flowing through.

4. The fault current limiter of claim 1, wherein a cathode of the DC diode is coupled to a positive DC terminal of the rectifier and a first terminal of the DC reactor, wherein a second terminal of the DC reactor is coupled to a negative terminal of the bias DC source, and wherein an anode of the DC diode is coupled to a negative DC terminal of the rectifier and a positive terminal of the bias DC source.

5. The fault current limiter of claim 1, wherein the bias DC source comprises a second AC power source and a second rectifier to convert AC power generated from the second AC power source into DC power, wherein the second rectifier is a bridge rectifier having four diodes.

6. A fault current limiter for limiting a fault current of an alternate current (AC) power source drawn by a load, the fault current limiter comprising:
    a rectifier having AC terminals and direct current (DC) terminals, the AC terminals to be coupled to the AC power source and the load;
    a DC diode coupled in parallel across the DC terminals of the rectifier; and
    a DC reactor coupled to the DC diode, wherein when an AC current drawn from the AC power source is less than a predetermined threshold, the DC diode is in a forward bias state to allow the AC current flowing to the load through the DC diode, wherein when the AC current drawn from the AC power source is greater than or equal to the predetermined threshold, the DC diode is in a reverse bias state, forcing the AC current to flow to the load through the DC reactor, and wherein the DC reactor is to limit an amount of the AC current flowing through the DC reactor, wherein the rectifier is a bridge rectifier having a first, second, third, and fourth diodes, wherein an anode of the first diode is coupled to a cathode of the second diode to form a first AC terminal of the rectifier, wherein a cathode of the first diode is coupled to a cathode of the third diode to form a positive DC terminal of the rectifier, wherein an anode of the third diode is coupled to a cathode of the fourth diode to form a second AC terminal of the rectifier, and wherein a cathode of the second diode is coupled to a cathode of the fourth diode to form a negative DC terminal of the rectifier.

7. A fault current limiter for limiting a fault current of an alternate current (AC) power source drawn by a load, the fault current limiter comprising:
    a rectifier having AC terminals and direct current (DC) terminals, the AC terminals to be coupled to the AC power source and the load;
    a DC diode coupled in parallel across the DC terminals of the rectifier; and
    a DC reactor coupled to the DC diode, wherein when an AC current drawn from the AC power source is less than a predetermined threshold, the DC diode is in a forward bias state to allow the AC current flowing to the load through the DC diode, wherein when the AC current drawn from the AC power source is greater than or equal to the predetermined threshold, the DC diode is in a reverse bias state, forcing the AC current to flow to the load through the DC reactor, and wherein the DC reactor is to limit an amount of the AC current flowing through the DC reactor, wherein the rectifier comprises a first rectifier and a second rectifier, wherein the DC diode comprises a first DC diode and a second DC diode, wherein the DC reactor comprises a first DC reactor and a second DC reactor, wherein the first rectifier, the first DC diode, and the first DC reactor form a first current limiter to limit the AC current during a positive half of a power cycle generated from the AC source, and wherein the second rectifier, the second DC diode, and the second DC reactor form a second current limiter to limit the AC current during a negative half of a power cycle generated from the AC source.

8. The fault current limiter of claim 7, wherein the first current limiter is to limit the AC current based on a first predetermined threshold, and wherein the second current limiter is to limit the AC current based on a second predetermined threshold that is different than the first predetermined threshold.

9. The fault current limiter of claim 8, further comprising a first bias DC source coupled to the first current limiter and a second bias DC source coupled to the second current limiter, and wherein the first bias DC source is to provide the first predetermined threshold and the second bias DC source is to provide the second predetermined threshold.

10. A fault current limiter for limiting a fault current of an alternate current (AC) power source drawn by a load, the fault current limiter comprising:
    a rectifier having AC terminals and direct current (DC) terminals, the AC terminals to be coupled to the AC power source and the load;
    a DC diode coupled in parallel across the DC terminals of the rectifier;
    a DC reactor coupled to the DC diode; and
    a bias DC source coupled to the DC diode and the DC reactor, wherein when an AC current drawn from the AC power source is less than a bias current threshold provided by the bias DC source, the DC diode is in a forward bias state to allow the AC current flowing to the load through the DC diode, wherein when the AC current drawn from the AC power source is greater than or equal to the bias current threshold, the DC diode is in a reverse bias state, forcing the AC current to flow to the load through the DC reactor, and wherein the DC reactor is to limit an amount of the AC current flowing through the DC reactor.

11. The fault current limiter of claim 10, wherein a cathode of the DC diode is coupled to a positive DC terminal of the rectifier and a first terminal of the DC reactor, wherein a second terminal of the DC reactor is coupled to a negative terminal of the bias DC source, and wherein an anode of the DC diode is coupled to a negative DC terminal of the rectifier and a positive terminal of the bias DC source.

12. The fault current limiter of claim 10, wherein the bias DC source comprises a second AC power source and a second rectifier to convert AC power generated from the second AC power source into DC power, wherein the second rectifier is a bridge rectifier having four diodes.

13. The fault current limiter of claim 10, wherein when the DC diode is in the forward bias state, the DC diode is turned on to allow the AC current flowing through, and wherein when the DC diode is in the reverse bias state, the DC diode is shut off to block the AC current flowing through.

14. The fault current limiter of claim 10, wherein the rectifier is a bridge rectifier having a first, second, third, and fourth diodes, wherein an anode of the first diode is coupled to a cathode of the second diode to form a first AC terminal of the rectifier, wherein a cathode of the first diode is coupled to a cathode of the third diode to form a positive DC terminal of the rectifier, wherein an anode of the third diode is coupled to a cathode of the fourth diode to form a second AC terminal of the rectifier, and wherein a cathode of the second diode is coupled to a cathode of the fourth diode to form a negative DC terminal of the rectifier.

15. A fault current limiter for limiting a fault current of an alternate current (AC) power source drawn by a load, the fault current limiter comprising:
    a first current limiting circuit to limit the AC current during a positive half of a power cycle of the AC power source, wherein the first current limiting circuit includes a first rectifier, a first DC diode, and a first DC reactor coupled to the first rectifier and the first DC diode; and
    a second current limiting circuit to limit the AC current during a negative half of the power cycle of the AC power source, wherein the second current limiting circuit includes a second rectifier, a second DC diode, and a second DC reactor coupled to the second rectifier and the second DC diode,
    wherein during the positive half of the power cycle when an AC current drawn from the AC power source is less than a first predetermined bias current, the first DC diode is in a forward bias state to allow the AC current flowing to the load through the first DC diode, wherein during the positive half of the power cycle when the AC current drawn from the AC power source is greater than or equal to the first predetermined bias current, the first DC diode is in a reverse bias state, forcing the AC current to flow to the load through the first DC reactor, and wherein the first DC reactor is to limit an amount of the AC current flowing through the DC reactor, and
    wherein during the negative half of the power cycle when an AC current drawn from the AC power source is less than a second predetermined bias current, the second DC diode is in a forward bias state to allow the AC current flowing to the load through the second DC diode, wherein during the negative half of the power cycle when the AC current drawn from the AC power source is greater than or equal to the second predetermined bias current, the second DC diode is in a reverse bias state, forcing the AC current to flow to the load through the second DC reactor, and wherein the second DC reactor is to limit an amount of the AC current flowing through the DC reactor.

16. The fault current limiter of claim 15, further comprising:
    a first bias DC source coupled to the first DC diode and the first DC reactor to provide the first predetermined bias current; and
    a second bias DC source coupled to the second DC diode and the second DC reactor to provide the second predetermined bias current.

17. The fault current limiter of claim 16, wherein the first predetermined bias current is different than the second predetermined bias current.

18. The fault current limiter of claim 16, wherein the AC power source is coupled to an anode of the first rectifier, an anode of the second DC diode, and a negative terminal of the second bias DC source, and wherein the load is coupled to an anode of the first DC diode, and a positive terminal of the first bias DC source, and an anode of the second rectifier.

19. The fault current limiter of claim 18, wherein a cathode of the first rectifier is coupled to a cathode of the first DC diode and a first terminal of the first DC reactor, and wherein a second terminal of the first DC reactor is coupled to a negative terminal of the first bias DC source.

20. The fault current limiter of claim 19, wherein a cathode of the second rectifier is coupled to a cathode of the second DC diode and a first terminal of the second DC reactor, and wherein a second terminal of the second DC reactor is coupled to a positive terminal of the second bias DC source.

21. A fault current limiter for limiting a fault current of an alternate current (AC) power source drawn by a load, the fault current limiter comprising:
    a bias DC source to provide a predetermined bias current;

a DC reactor coupled to the bias DC source in series to limit an amount of an AC current flowing through;

a first current limiting circuit to limit the AC current during a positive half of a power cycle of the AC power source, wherein the first current limiting circuit includes a first rectifier and a first DC diode;

a second current limiting circuit to limit the AC current during a negative half of a power cycle of the AC power source, wherein the second current limiting circuit includes a second rectifier and a second DC diode;

a transformer coupling the first current limiting circuit and the second current limiting circuit to the DC reactor and the bias DC source, wherein during the positive half of the power cycle when an AC current drawn from the AC power source is less than the predetermined bias current produced by the bias DC source, the first DC diode is in a forward bias state to allow the AC current flowing to the load through the first DC diode, wherein during the positive half of the power cycle when the AC current drawn from the AC power source is greater than or equal to the predetermined bias current, the first DC diode is in a reverse bias state, forcing the AC current to flow to the load through the first DC reactor, and wherein during the negative half of the power cycle when an AC current drawn from the AC power source is less than the predetermined bias current, the second DC diode is in a forward bias state to allow the AC current flowing to the load through the second DC diode, wherein during the negative half of the power cycle when the AC current drawn from the AC power source is greater than or equal to the predetermined bias current, the second DC diode is in a reverse bias state, forcing the AC current to flow to the load through the DC reactor.

22. The fault current limiter of claim 21, wherein the AC source is coupled to an anode of the first rectifier, an anode of the second DC diode, and a first terminal of a first winding of the transformer, wherein the load is coupled to an anode of the first DC diode and a second terminal of a second winding of the transformer, wherein a first terminal of the second winding of the transformer is coupled to a second terminal of the first winding of the transformer and a first terminal of the DC reactor, and wherein a second terminal of the DC reactor is coupled to a negative terminal of the bias DC source.

23. The fault current limiter of claim 22, wherein a cathode of the first rectifier is coupled to a cathode of the first DC diode, a cathode of the second rectifier, a cathode of the second DC diode, and a positive terminal of the bias DC source.

* * * * *